(No Model.)

B. A. STEVENS.
Press for Meat Fruit, &c.

No. 232,619.　　　　　　　　　Patented Sept. 28, 1880.

WITNESSES
Wm A Skinkle
Chas. H. Baker.

INVENTOR
Benjamin A Stevens,
By his Attorneys
Baldwin, Hopkins, & Peyton.

UNITED STATES PATENT OFFICE.

BENJAMIN A. STEVENS, OF TOLEDO, OHIO.

PRESS FOR MEAT, FRUIT, &c.

SPECIFICATION forming part of Letters Patent No. 232,619, dated September 28, 1880.

Application filed August 27, 1880. (No model.)

*To all whom it may concern:*

Be it known that I, BENJAMIN A. STEVENS, of Toledo, in the county of Lucas and State of Ohio, have invented certain Improvements in Presses for Meat, Fruit, &c., of which the following is a specification.

My invention relates to presses for the use of families and dealers; and it consists in providing a pan in which the meat can be compressed that is independent of the press, and can readily be removed therefrom, and the meat retained in it under pressure.

By this construction any number of pans can be used in connection with a single press, the press can be mounted upon a suitable support in a convenient place, and the pans when filled can be removed and placed in any desired receptacle, and separate pans can be used for different materials—such as meat, fruit, vegetables, &c.—which is very desirable.

Figure 1:
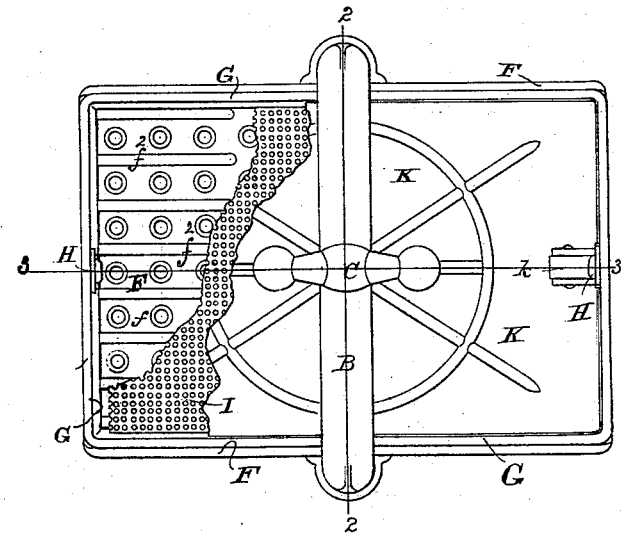
Figure 2:
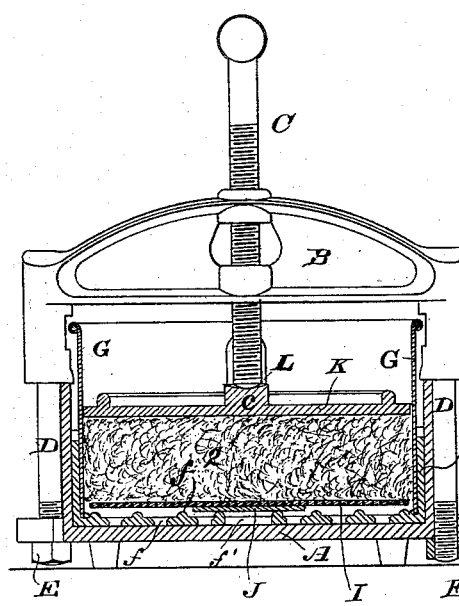
Figure 3:
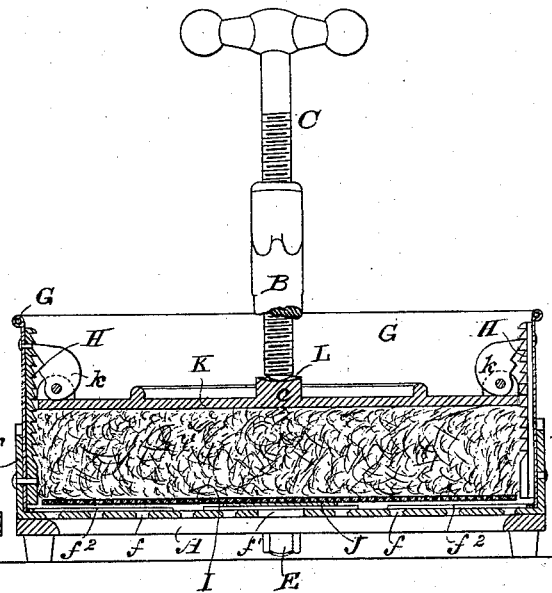

In the accompanying drawings, Figure 1 is a plan view, partly broken away. Fig. 2 is a section on the line 2 2 of Fig. 1, and Fig. 3 is a section on the line 3 3 of Fig. 1.

The press is composed of two parts—the base A and the cross-bar or arch B, in which latter the press-screw C turns and has its bearing. These parts are made of cast metal, and are securely united, as shown, by means of bolts D D and nuts E E.

The pan of the press is composed of a box or base, F, of cast metal, having a perforated bottom, $f$, the central perforation, $f'$, being of much larger diameter than the others. The bottom of the pan is also provided with ribs $f^2$ upon its inner side. The sheet-metal walls G of the pan are secured to this box or base, and are made of the desired height.

Racks H H are secured within the pan at each end. A light perforated sheet-metal plate, I, upon which the material to be pressed is placed, rests upon the ribs $f^2$ on the bottom of the pan. A small plate, J, is loosely placed over the large central opening in the bottom of the pan before the perforated plate I is put in place, or it may be put above said plate.

A press-plate or follower, K, fits snugly in the pan, and is provided with pawls or detents $k$ $k$, adapted to engage with the racks H H on the end walls of the pan. The press-screw C fits into a depression, L, formed in an enlargement, $c$, on the upper face of the follower, which is ribbed, as shown, to secure greater strength. The material to be pressed being placed in the pan, it is slid into the press, and the follower is forced down by the screw. When sufficient pressure has been applied the detents are made to engage with the racks, and the screw is reversed. The pan can then be removed from the press.

It is obvious that, instead of having the screw bear directly upon the press-plate of the pan, a follower might be permanently attached to the screw. The power would then be applied uniformly over the press-plate of the pan instead of only at its middle.

The compressed material is removed from the pan by pressing upon the plate J through the large central opening in the bottom of the pan.

Obviously, the details of construction of the press and pan may be varied without departing from the principal part of my invention.

Having thus described my invention, what I claim as new, and desire to secure by Letters Patent, is—

1. The removable press-pan having the independent press-plate or follower, and detent mechanism independent of the press for holding the follower in place after pressure has been removed, as set forth.

2. The removable press-pan provided with racks at each end, in combination with a follower independent of the press, and having locking pawls or detents, as set forth.

3. The press-pan provided with the ribbed perforated bottom, as set forth, in combination with the plates I and J and the independent follower and detent mechanism, substantially as described.

4. The combination, substantially as hereinbefore set forth, of the press-frame, the screw, and the removable independent pan having a follower and detent mechanism independent of the press, for the purpose set forth.

In testimony whereof I have hereunto subscribed my name.

BENJAMIN A. STEVENS.

Witnesses:
C. I. SCOTT,
A. FARQUHARSON.